(12) United States Patent
Navarro

(10) Patent No.: US 6,868,618 B2
(45) Date of Patent: Mar. 22, 2005

(54) GAUGE AND METHOD

(76) Inventor: Marcello Navarro, 221 N. Norwinden, Springfield, PA (US) 19064

( * ) Notice: Subject to any disclaimer, the term of this patent is extended or adjusted under 35 U.S.C. 154(b) by 0 days.

(21) Appl. No.: 10/255,753

(22) Filed: Aug. 20, 2002

(65) Prior Publication Data

US 2003/0061721 A1 Apr. 3, 2003

Related U.S. Application Data

(60) Provisional application No. 60/326,167, filed on Oct. 1, 2001.

(51) Int. Cl.$^7$ ................................................. G01B 5/08
(52) U.S. Cl. ........................... 33/555.1; 33/550; 33/542; 33/199 R
(58) Field of Search ........................ 33/1 M, 813, 815, 33/818, 819, 549, 550, 542, 543, 544.5, 544.6, 551, 552, 553, 554, 555, 555.1, 199 R, 199 B, 555.3

(56) References Cited

U.S. PATENT DOCUMENTS

| | | | |
|---|---|---|---|
| 1,908,253 A | | 5/1933 | Johnson |
| 1,992,606 A | * | 2/1935 | Darlington .................... 33/805 |
| 2,218,111 A | | 10/1940 | Johnson |
| 2,842,862 A | * | 7/1958 | Johnson ..................... 33/199 R |
| 3,388,476 A | | 6/1968 | Johnson |
| 4,128,943 A | * | 12/1978 | Muhlethaler .................. 33/542 |
| 4,586,261 A | | 5/1986 | Beaupere |
| 4,651,430 A | * | 3/1987 | Vasku .......................... 33/550 |
| 4,803,783 A | * | 2/1989 | Tiegs et al. .................... 33/550 |
| 4,974,327 A | * | 12/1990 | Greenslade ............... 33/199 R |
| 4,977,682 A | * | 12/1990 | Allen, III ..................... 33/550 |
| 4,989,331 A | | 2/1991 | Dodge |
| 5,014,001 A | * | 5/1991 | Schmidt et al. ............. 324/758 |
| 5,214,856 A | | 6/1993 | Masselink |
| 5,408,750 A | * | 4/1995 | Teng et al. .................. 33/1 M |
| 5,490,333 A | | 2/1996 | Nelson |
| 5,711,083 A | * | 1/1998 | Bidwell ....................... 33/543 |
| 5,903,125 A | * | 5/1999 | Prentice et al. .............. 33/1 M |
| 5,987,764 A | | 11/1999 | Greenslade |
| 6,327,929 B1 | * | 12/2001 | Yanagisawa .................. 33/1 M |
| 6,381,861 B1 | * | 5/2002 | Deterling ................... 33/555.1 |

* cited by examiner

Primary Examiner—G. Bradley Bennett
Assistant Examiner—Madeline Gonzalez
(74) Attorney, Agent, or Firm—Robert J. Yarbrough

(57) ABSTRACT

The invention is a gauge and method for measuring any circular object, but is most useful as a precision thread gauge for objects having either external or internal threads. A fixed gauge roll is supported in a stationary position. A first and second gauge rolls are supported so that the first and second gauge rolls simultaneously move with respect to the fixed gauge roll. The fixed gauge roll, first and second gauge roll together form a triangle. The interior angles of the triangle remain unchanged for every position of the three gauge rolls.

20 Claims, 15 Drawing Sheets

44, 48, 52

58

44, 48, 52

GAUGE AND METHOD

RELATED APPLICATIONS

This application is related to and claims priority from provisional patent application No. 60/326,167 filed by Marcello Navarro on Oct. 1, 2001.

BACKGROUND OF THE INVENTION

1. Field of the Invention

The Invention relates to the precision measurement of circular objects, particularly to fasteners having external or internal threads, such as the cylindrical or tapered threads on a bolt or a nut. The Invention also applies the measurement of a cylindrical or tapered object, such as a rod, or a circular space, such as a bored hole. The Invention includes a method of measuring an object.

The precision measuring apparatus and method of the Invention is most applicable to those industries requiring precision measurement of fasteners, such as the aerospace industry and the medical devices industry.

2. Background of the Invention

In this application, a fastener such as a bolt with external threads to be measured is referred to as an 'external thread.' A fastener such as a nut with internal threads to be measured is referred to as an 'internal thread.' A 'circular object' includes any object with a circular cross section, such as a cylindrical or tapered object or external thread, and any object having a circular opening, such as a bored hole or an internal thread.

Prior art precision thread gauges incorporate two stationary gauge rolls and one movable gauge roll. See, for example, U.S. Pat. No. 6,381,861 B1 to Deterling, issued May 7, 2002, and U.S. Pat. No. 4,974,327 to Greenslade, issued Dec. 4, 1990. For purposes of this application, the term 'gauge roll' generally means the portion of the gauge that physically touches the object to me measured. The gauge roll may be a designated portion of a component, such as a table as hereinafter defined. Alternatively, the gauge roll may be a separate part of the apparatus that is releasably attached to another component of the apparatus. Where the object to be measured is an external thread, the gauge roll is a piece of hard material, such as carbide or hardened tool steel, formed to match the profile of an external thread to be measured. For example, if the external thread to be measured has ten turns per inch, the gauge rolls used to measure that external thread also will exhibit a profile of ten turns per inch.

Gauge rolls for measuring threads are conventional in the art and different types of gauge rolls may be selected to measure different aspects of a thread. Gauge rolls also may be polygonal (for example, square) in cross section, may be formed as a vertically or horizontally disposed blade, may be tapered (for measuring a tapered thread or other tapered circular object) and may take the form of a sharp point. As used in this application, 'gauge roll' includes all configurations for a gauge roll. For simplicity, the gauge rolls illustrated in this application are 'full form functional' gauge rolls and are cylindrical in form and generally circular in cross section.

In the prior art thread gauge, the single movable gauge roll is advanced toward the two stationary gauge rolls until all three gauge rolls mesh with and engage the external threads. The position of the movable gauge roll with respect to the fixed gauge rolls is noted.

The prior art thread gauge must be set up to measure a particular diameter of external thread (hereinafter the "set up diameter") by selecting gauge rolls of a precise size. If the diameter of a measured external thread is precisely the size of the set up diameter, then the prior art gauge works well. If the external thread to be measured is smaller or larger than the precise set up diameter, then it is difficult to determine the actual size of the external thread from the measurement provided by the prior art gauge.

The shortcoming of the prior art gauge lies in its geometry. One way to visualize the problem with the prior art gauge is to consider that each of the three gauge rolls has at lease one point of contact with the circular object being measured. Corresponding points of contact on the three gauge rolls together define a triangle. Because two gauge rolls are fixed and the third gauge roll moves with respect to the other two, the interior angles of that triangle change as the movable gauge roll is moved. Because of the changing angles, determining the actual diameter of an object that is smaller or larger than the set up diameter becomes a complex exercise in trigonometry.

SUMMARY OF THE INVENTION

The Invention solves the shortcomings of the prior art thread gauge by maintaining a single fixed gauge roll in a stationary position and simultaneously advancing two movable gauge rolls toward the stationary gauge roll until all three gauge rolls engage the circular object to be measured. The fixed gauge roll and two movable gauge rolls are supported so that a point where the fixed gauge roll touches a circular object to be measured forms a triangle with the corresponding points where the two movable gauge rolls touch the circular object. When the two movable gauge rolls are moved with respect to the fixed gauge roll, the interior angles of the triangle do not change. For every position of the two movable gauge rolls with respect to the fixed gauge roll, the interior angles of the triangle are the same.

As a result, the Invention can be used to measure directly of a wide range of diameters without the need for selecting gauge rolls of a particular size. The Invention therefore can be used in quality control and materials inspection applications to precisely determine whether, say, an external thread being examined meets its design specifications or whether, for a typical example, a tool used to manufacture the external thread is wearing out and approaching the time where the tool must be replaced or adjusted.

The Invention is useful for measuring any circular object, whether the circular object is threaded or not, and whether the gauge is measuring an internal or an external dimension.

DESCRIPTION OF AN EMBODIMENT

Figure 1:
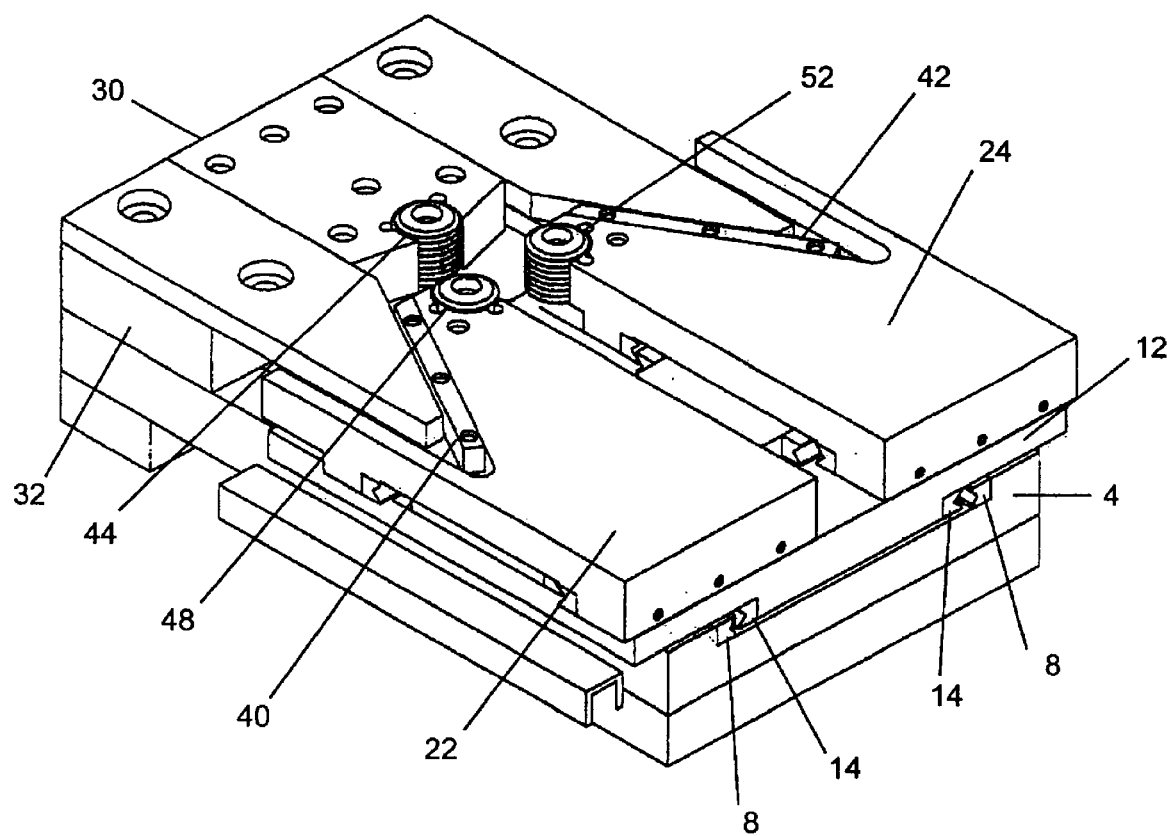
FIG. 1 is a perspective view of the gauge of the present Invention.
Figure 2:
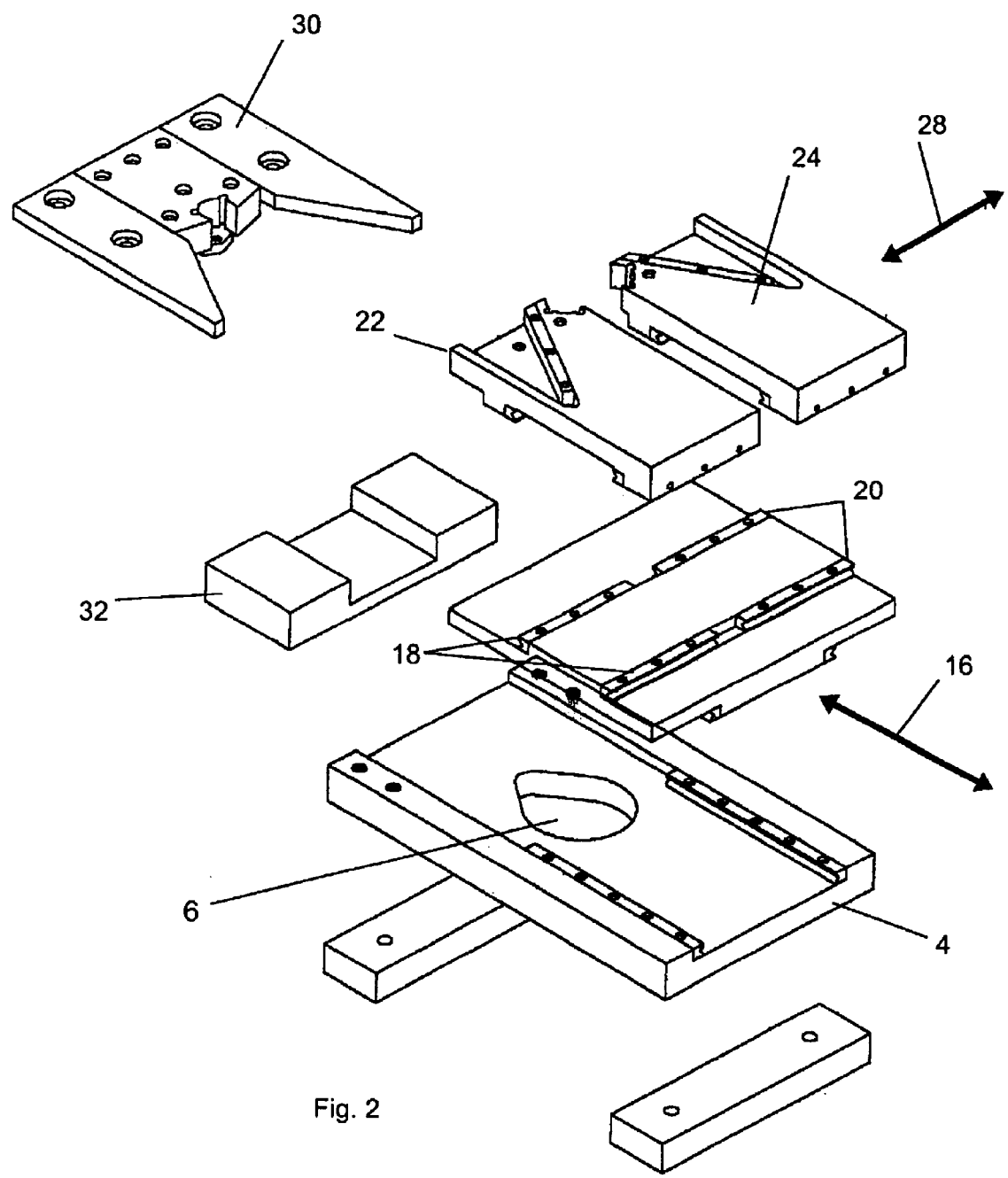
FIG. 2 is an exploded view of the gauge of the present Invention.
Figure 3:
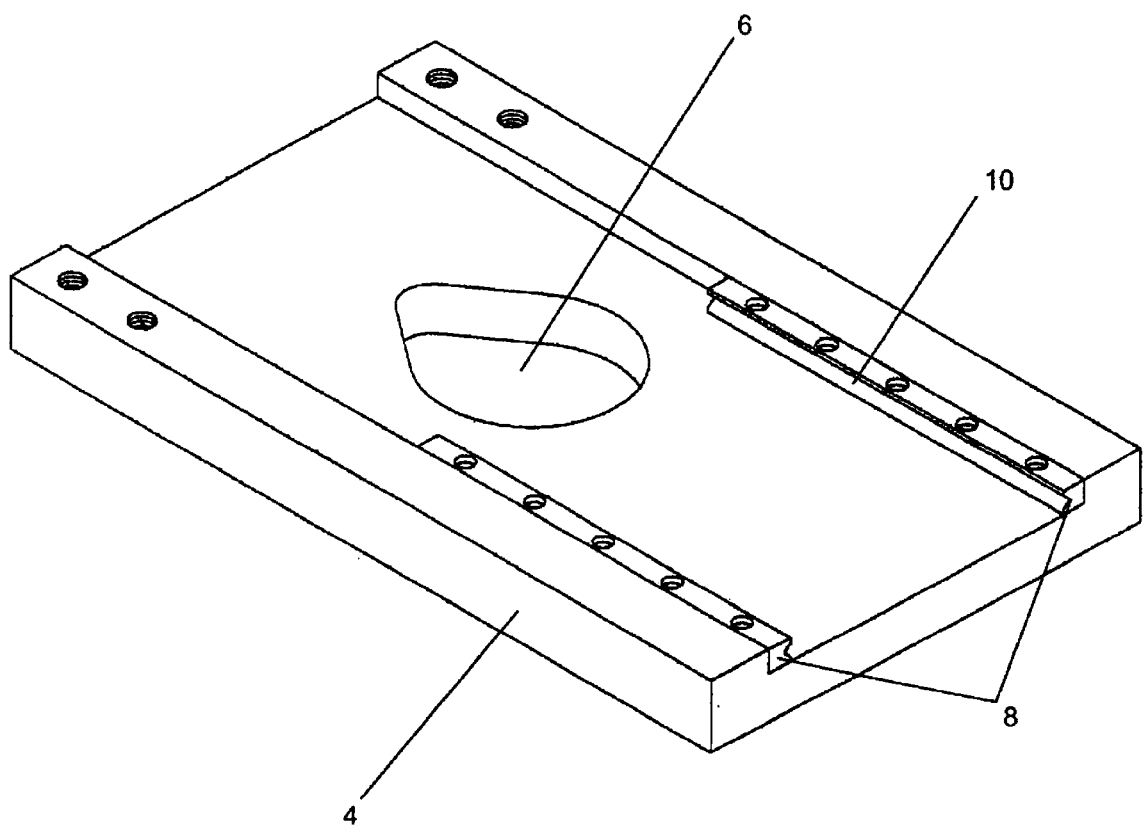
FIG. 3 is a perspective view of the base.

Referring to FIGS. 1 and 2, the gauge 2 of the present Invention includes a base 4. The base 4 (FIG. 3) includes and opening 6 through which an object to be measured (not shown) may be extended. The base 4 also includes ball bearing base slides 8 and bearing balls 10.

Figure 4:
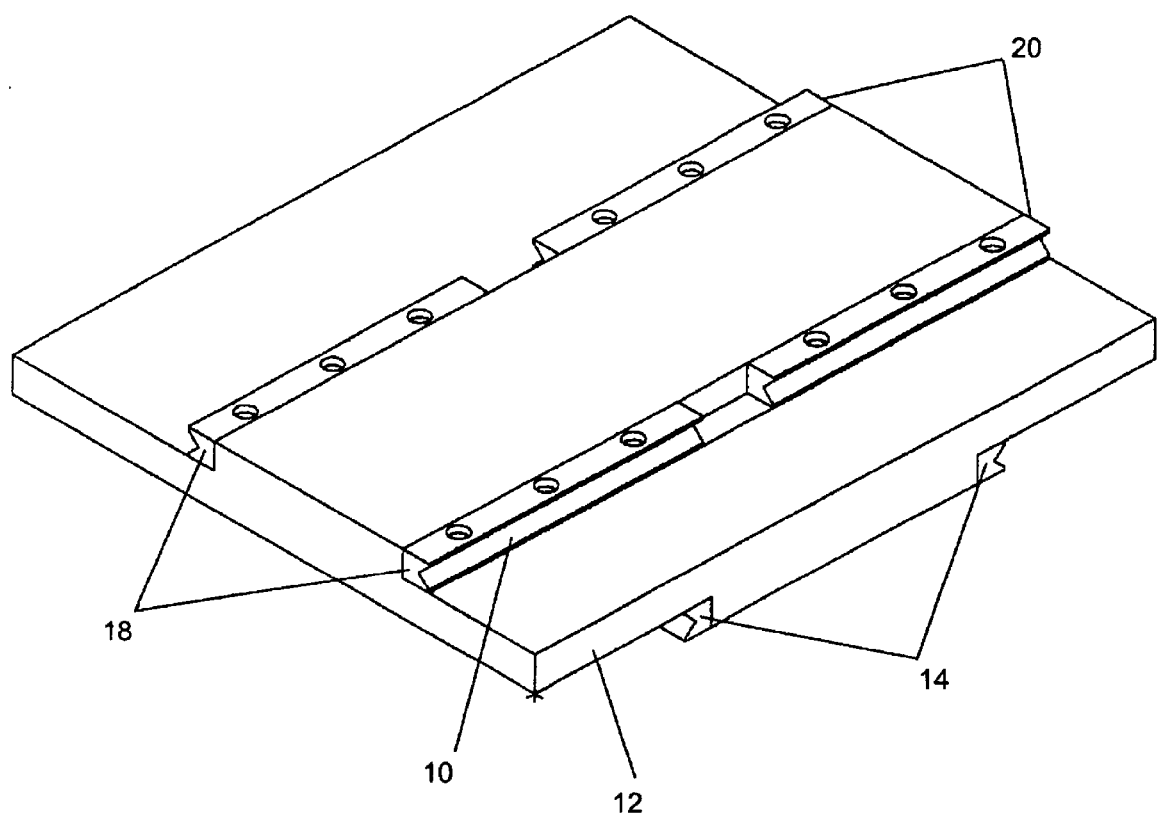
FIG. 4 is a perspective view of the carriage.

A carriage 12 (FIGS. 1 and 2) has attached ball bearing carriage slides 14 (FIGS. 1, 2 and 4) that cooperate with the base slides 8 and balls 10 to comprise a ball bearing assembly allowing carriage 12 to slide in a longitudinal direction 16 (FIG. 2) with respect to the base 4.

The carriage 12 is equipped with a first table-engaging bearing slide 18 and a second table-engaging bearing slide 20. The first table-engaging slide 18 and second table engaging slide 20 may comprise the same slide and are equipped with bearing balls 10.

A first table 22 and a second table 24 include carriage-engaging slides 26 engaging the corresponding table engaging slides 18, 20 of the carriage 12. The table-engaging slides 18, 20, the carriage engaging slides 26 and balls 10 comprise a ball bearing assembly allowing the first table 22 and second table 24 to move independently in a lateral direction 28 (FIGS. 2, 5) with respect to the carriage 12.

Figure 5:
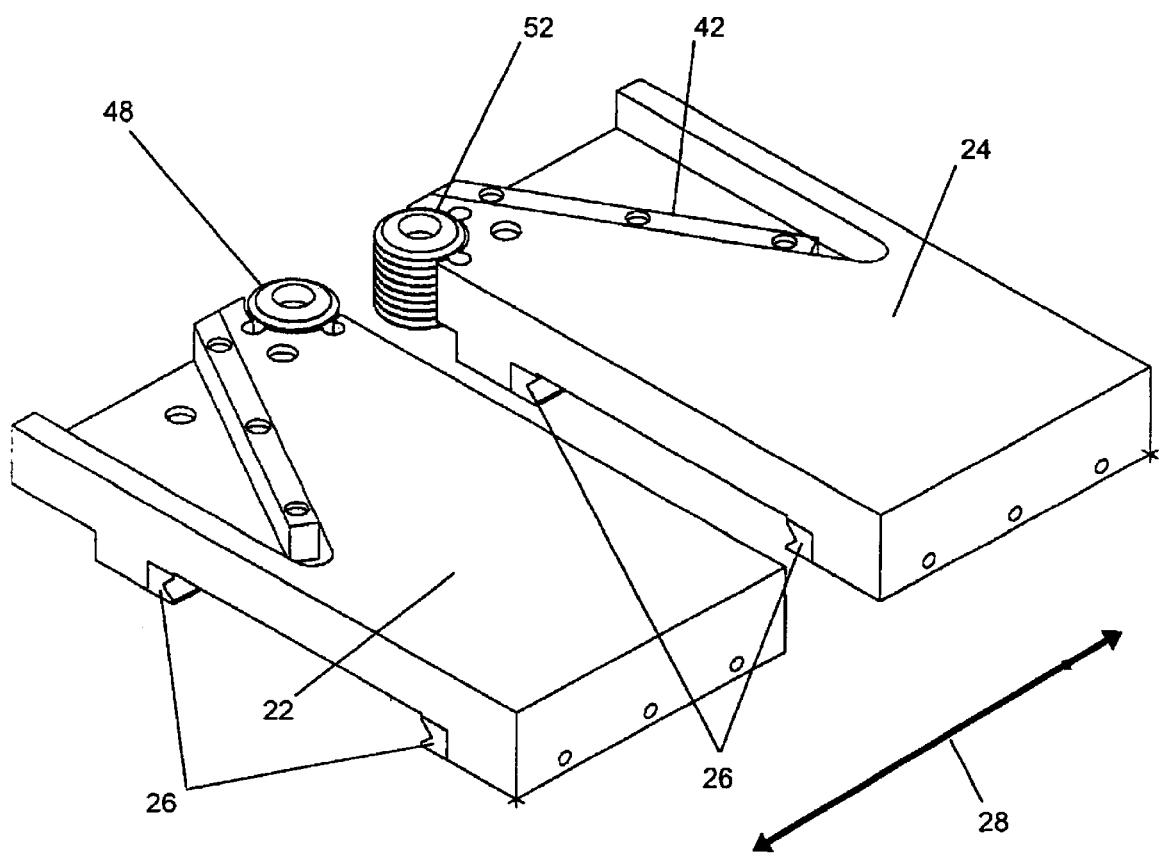
FIG. 5 is a perspective view of the tables.
Figure 6:
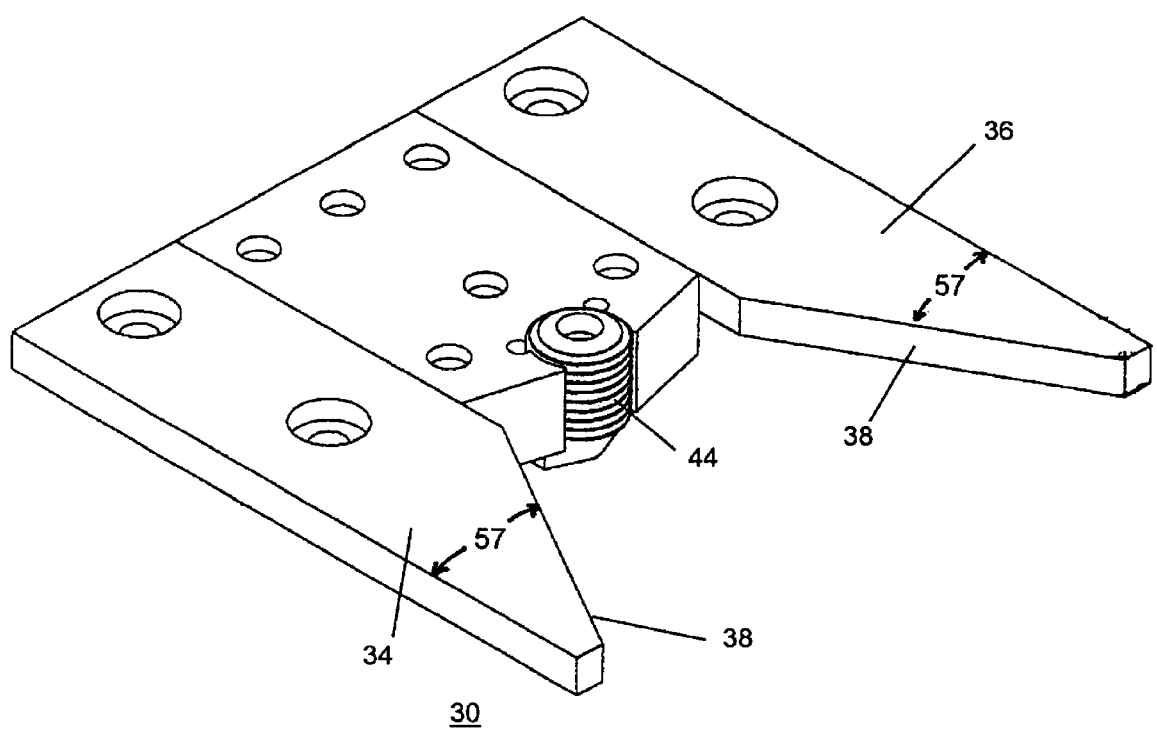
FIG. 6 is a perspective view of the motion controller.

A lateral motion controller 30 (FIGS. 1 and 2) is rigidly bolted to base 4 using spacer 32. Spacer 32 supports lateral motion controller 30 at an appropriate height above base 4. Lateral motion controller 30 includes a first sine bar 34 and a second sine bar 36 (FIG. 6). Each of the first sine bar 34 and second sine bar 36 is equipped with a bearing surface 38. The bearing surface 38 of the first sine bar 34 slidably engages a first adjustable strip 40 (FIGS. 1, 5). First adjustable strip 40 is adjustably attached to first table 22. The bearing surface 38 of the second sine bar 36 slidably engages a second adjustable strip 42 of second table 24.

Bearing surface 38 of first sine bar 34 and second sine bar 36 of the lateral motion controller 30 are supported at an angle 57 (FIG. 6) with respect to the longitudinal direction 16. The angle 57 preferably is 30°.

When the carriage 12 is moved in the longitudinal direction 16 with respect to the base 4, first and second tables 22, 24 supported by the carriage 12 also move in the longitudinal direction 16 by the same distance as the base 4. As the tables 22, 24 move with base 4, the first adjustable strip 40 of the first table 22 slidably engages the bearing surface 38 of first sine bar 34. The bearing surface 38 of first sine bar 34 constrains the motion of the first adjustable strip 40, and hence first table 22, forcing the first table 22 to assume a predetermined lateral position for each position of the carriage 12 with respect to the base 4.

The motion of the second table 24 is a mirror image of the motion of first table 22. As the carriage 12 moves in the longitudinal direction 16 with respect to base 4, table 24 also moves in the longitudinal direction 16. The bearing surface 38 of second sine bar 36 slidably engages the second adjustable strip 42. The bearing surface 38 of second sine bar 36 constrains the motion of second table 24 in the lateral direction 28, forcing the second table 24 to assume a predetermined position in the lateral direction 28 for each position of the carriage 12 in the longitudinal direction 16 with respect to the base 4.

A fixed gauge roll 44 is rigidly affixed to the base 4 and supported at an appropriate height above the base 4. As shown by FIGS. 1, 2 and 6, the fixed gauge roll 44 is preferably supported by the lateral motion controller 30 and spacer 32. The fixed gauge roll 44 contacts the circular object (designated as 55 on FIG. 8) at least at one point 46.

A first gauge roll 48 (FIGS. 1, 5) is rigidly attached to first table 22. As first table 22 moves, so moves first gauge roll 48. First gauge roll 48 contacts the circular object 55 to be measured at a point of contact 50 (FIG. 8).

A second gauge roll 52 (FIGS. 1, 5) is rigidly attached to second table 24. As second table 24 moves, so moves second gauge roll 52. Second gauge roll 52 contacts the circular object 55 to be measured at a point of contact 54 (FIG. 8).

Figure 7:
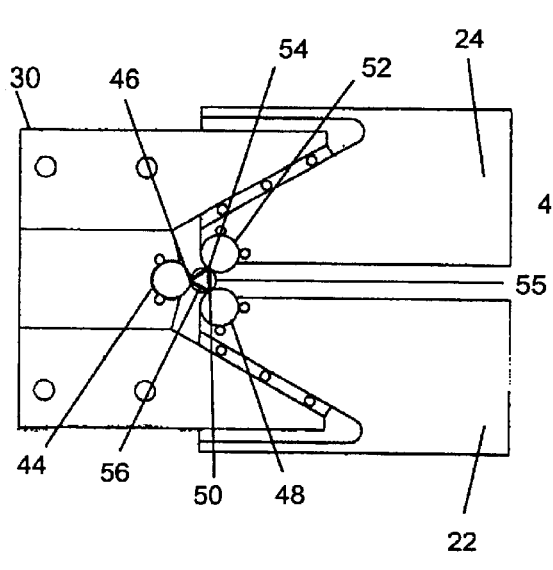
FIG. 7 is a plan view of the gauge with the gauge rolls in a first position.
Figure 8:
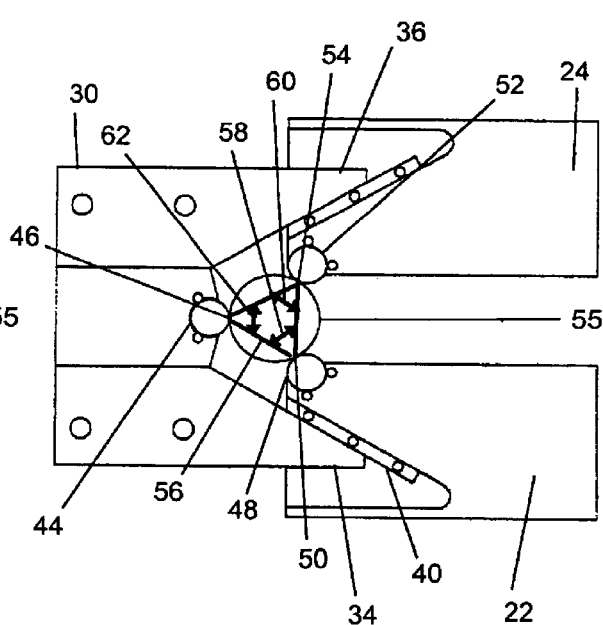
FIG. 8 is a plan view of the gauge with the gauge rolls in a second position.

Referring to FIGS. 7 and 8, a point of contact 46 between the fixed gauge roll 44 and the circular object being measured 55, will have corresponding points of contact 50, 54 on the first and second gauge rolls 48, 52 in a plane parallel to a plane of motion of the first table 22 and second table 24.

A point of contract 46 between the fixed gauge roll 44 and the circular object 55 in combination with the corresponding points of contact 50, 54 for the first and second gauge rolls 38, 52 define a triangle 56 (FIGS. 7 and 8). FIGS. 7 and 8 show the gauge 2 in two different positions. As shown by FIGS. 7 and 8, the interior angles 58, 60, 62 of triangle 56 remain unchanged for every position of the carriage 12 with respect to base 4, and hence remain unchanged for every position of first gauge roll 48 and second gauge roll 52 with respect to fixed gauge roll 44.

FIGS. 7 and 8 illustrate triangle 56 as an equilateral triangle, which is achieved with angle 57 of first sine bar 34 and angle 57 of second sine bar 36 both equal to 30°; however, angle 57 of first sine bar 34 and second sine bar 36 may be different from each other and may be different from 30°. If angle 57 is equal for both first sine bar 34 and second sine bar 36 but is not 30°, then an isosceles triangle 56 is the result. If angles 57 for first sine bar 34 and second sine bar 36 are different one from the other, an irregular triangle 56 will result. Irregular and isosceles triangles 56 are contemplated by the Invention. All values for angle 57 are contemplated up to 90°.

In use, an external thread to be measured is placed within the triangle 56. The carriage 12 is advanced in the longitudinal direction toward fixed gauge roll 44. First gauge roll 48 and second gauge roll 52, attached to the first and second tables 22, 24 also advance toward fixed gauge roll 44, maintaining the interior angles 48, 60 and 62 constant, until the external thread engages all three of fixed gauge roll 44, first gauge roll 48 and second gauge roll 52. The location of the carriage 12 with respect to the base 4 is measured. The diameter of the external thread is directly proportional to the measurement of the location of base 4 and carriage 12.

Figure 9:
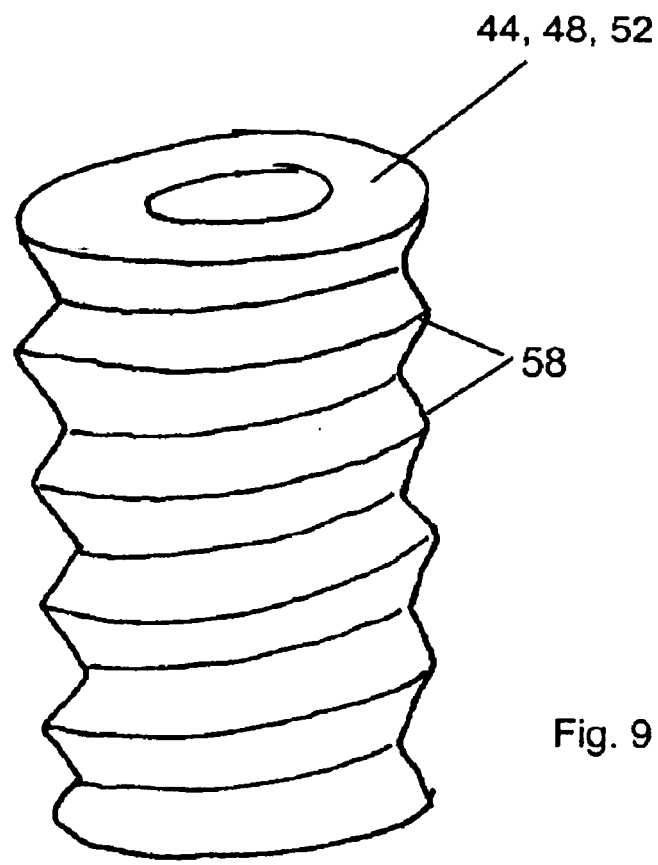
FIG. 9 is a perspective view of a first embodiment of a gauge roll.
Figure 10:
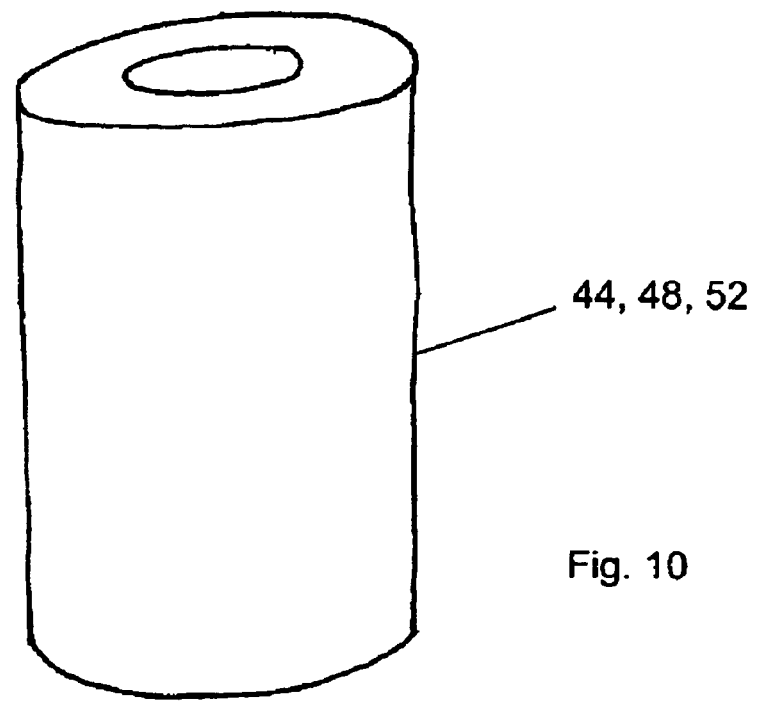
FIG. 10 is a perspective view of a second embodiment of a gauge roll.
Figure 11:
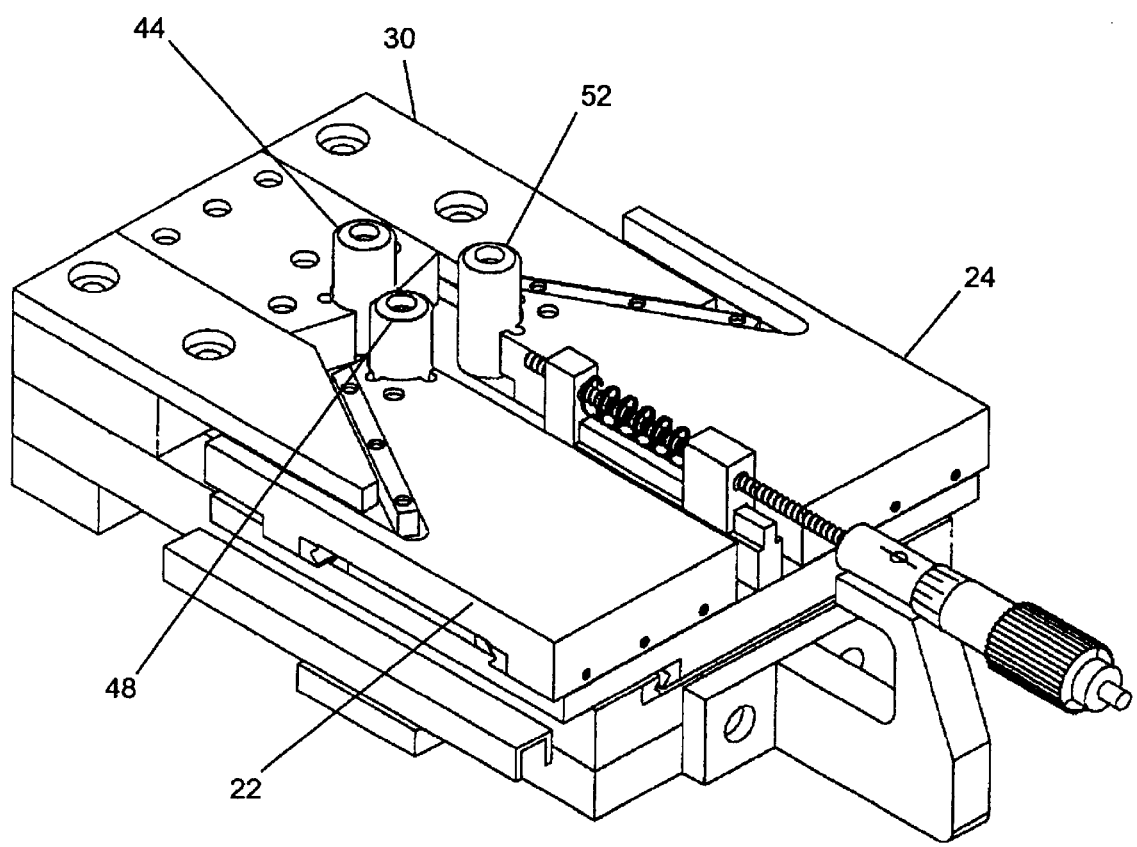
FIG. 11 is an alternative embodiment for measuring the internal diameter of a circular opening.

FIGS. 10 and 11 illustrate two possible embodiments of gauge rolls 44, 48, 52. FIG. 9 illustrates a generally cylindrical 'full form functional' gauge roll 44, 48, 52 having threads 58 to match the threads of an external thread to be measured. For example, if the external thread to be measured has ten turns per inch, the gauge roll will have threads 58 of ten turns per inch.

The Invention is useful for measuring any object with a circular dimension to be measured, in addition to external threads. Examples of objects that the Invention can be used to measure include the outside diameter of cylindrical (unthreaded) objects, the diameter of circular openings in objects, and the diameter of internal threads. FIG. 10 shows a second embodiment gauge roll 44, 48, 52 suitable for measurement of a cylindrical object, such as an unthreaded rod. The FIG. 11 second embodiment gauge roll 44, 48, 52 is a smooth cylinder.

FIG. 11 shows an embodiment of the gauge 2 adapted to measure the inside diameter of a circular object, such as a circular hole or opening. The fixed gauge roll 44, the first gauge roll 48 and the second gauge roll 52 extend above the surface of the lateral motion controller 30 and the first table 22 and second table 24. The object to be measures is placed over the gauge rolls 44, 48, 52 and the carriage 12 is moved in the longitudinal direction 16 away from fixed gauge roll 44 until all of the gauge rolls 44, 48, 52 engage the inner surface hole or opening of the object to be measured. The location of the carriage 12 with respect to the base 4 is measured, determining the diameter of the hole or opening measured.

The term 'placing an object in relation to a triangle' used in the claims means, with respect to a circular hole, opening or internal thread, to place the circular opening so that upwardly extending gauge rolls 44, 48 and 52 as shown by FIG. 11 are inside the circular opening. The term 'placing an object in relation to a triangle' means, with respect to a cylindrical or tapered object or an external thread, to place the object within the triangle.

Figure 12:
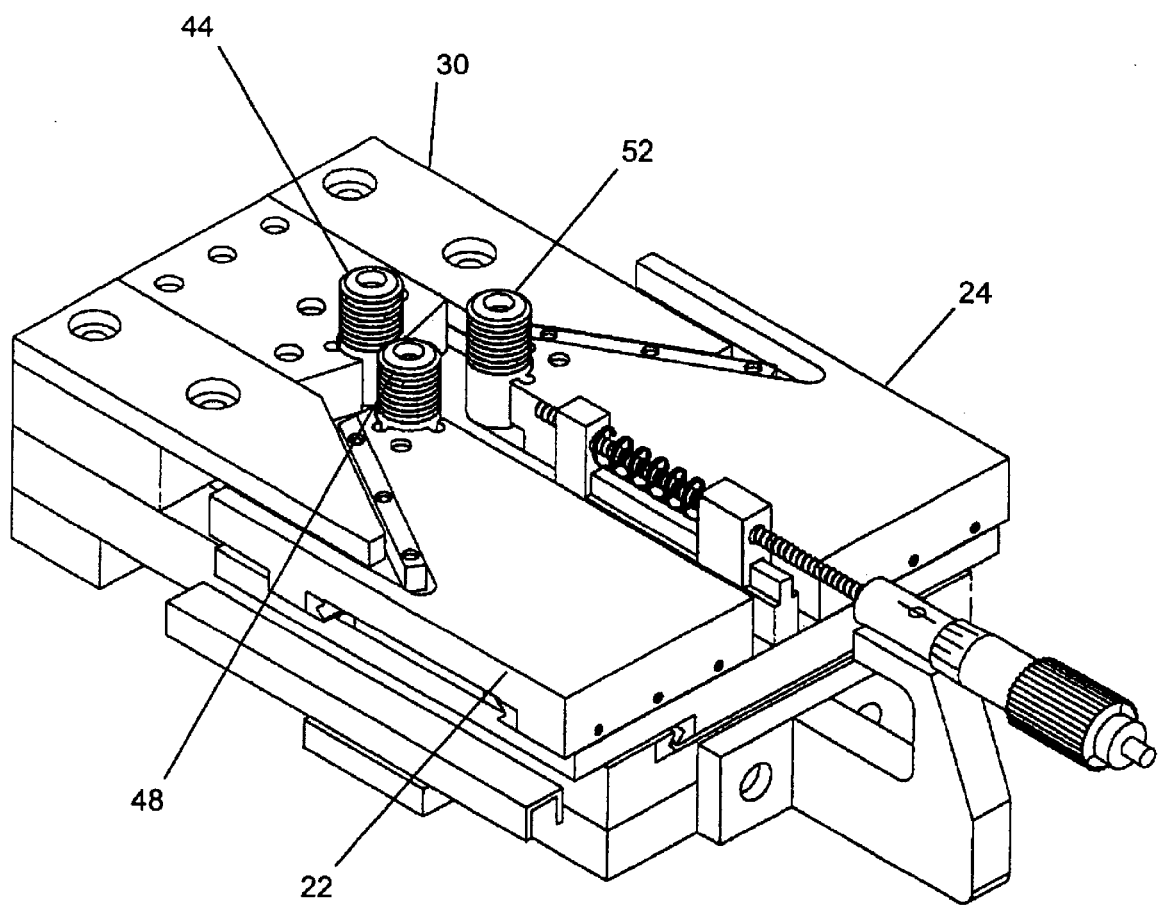
FIG. 12 is an alternative embodiment for measuring the internal diameter of an internal thread.

FIG. 12 shows an alternative embodiment of the Invention adapted to measure the diameter of internal threads. Gauge rolls 44, 48 and 52 have threads corresponding to the threads to be measured and extend above the level of the lateral motion controller 30, first table 22 and second table 24. The internal thread to be measured is placed over gauge rolls 44, 48, 52 and the carriage 12 is moved in the longitudinal direction 16 away from fixed gauge roll 44 until all three gauge rolls 44, 48, 52 engage the internal threads. The location of the carriage 12 with respect to the base 4 is measured, determining the inside diameter of the internal threads to be measured.

Figure 13:
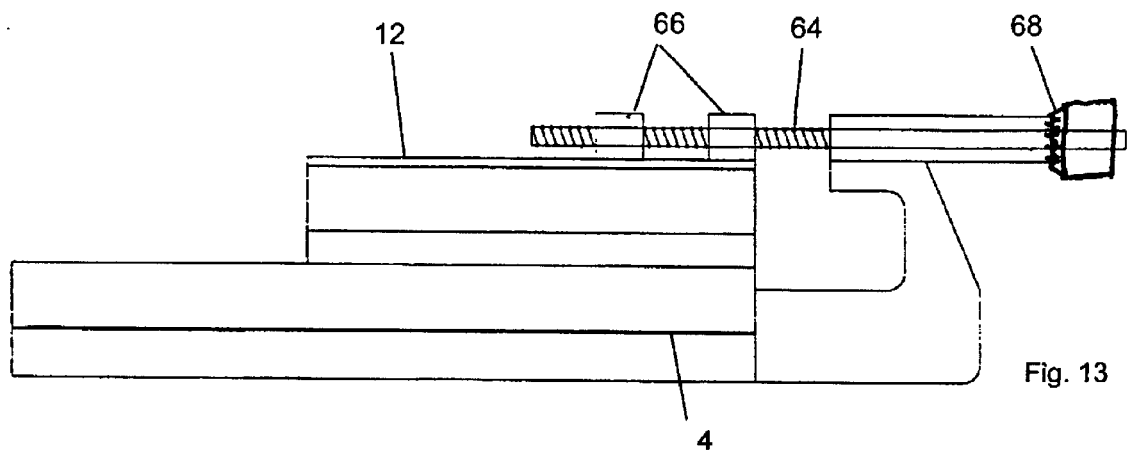
FIG. 13 is a side view including a micrometer scale.

FIG. 13 shows one means for moving the carriage 12 with respect to base 4. A screw support bracket 62 is attached to base 4. A screw 64 is supported and retained by screw supporting bracket 62. Threaded screw bosses 66 are attached to carriage 12. Turning screw 64 moves the threaded screw bosses 66 with respect to screw retaining arm 62, and hence moves carriage 12 with respect to base 4.

FIG. 13 shows only one means for moving carriage 12 with respect to base 4. Other means include a solenoid, a compressed air or vacuum cylinder, a motor, magnetic attraction, resilient members, springs, or any other method for moving an object with respect to another object.

Figure 14:
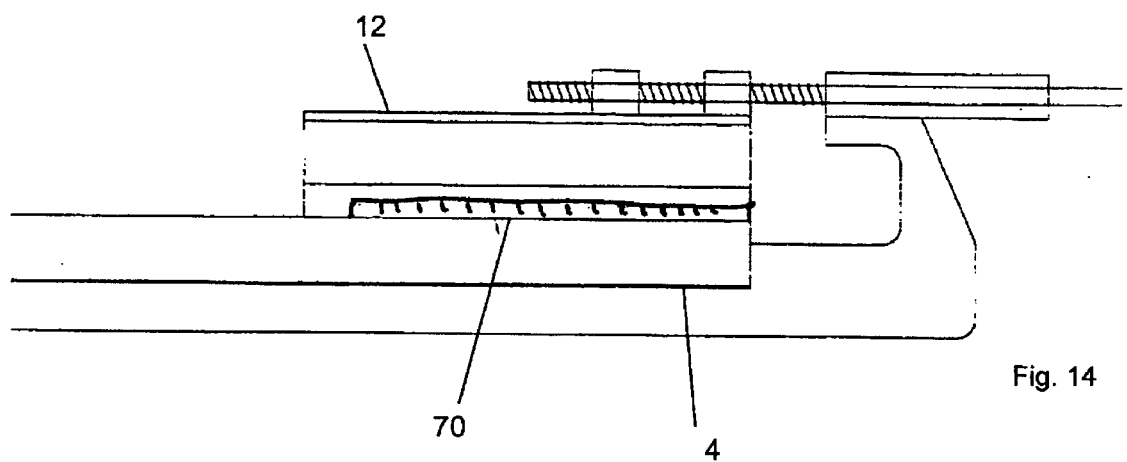
FIG. 14 is a side view including a vernier scale.
Figure 15:
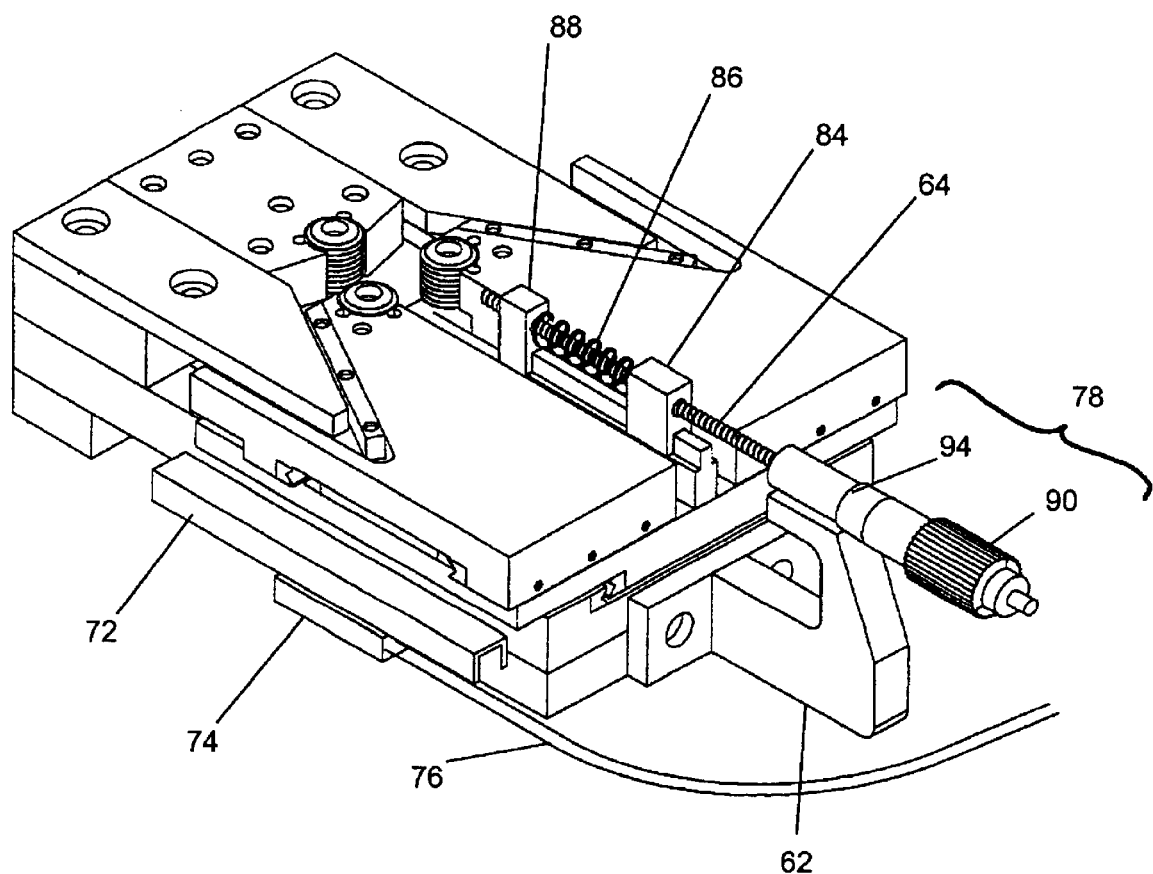
FIG. 15 is a perspective view of an alternative embodiment.

FIG. 13 also shows one means for measuring the location of the carriage 12 with respect to the base 4. A micrometer 68 incorporated into the screw 64 mechanism measures the location of carriage 12 with respect to base 4. FIG. 14 shows a vernier scale 70 arranged to measure the location of carriage 12 with respect to base. FIG. 15 shows a glass scale 72 and reader head 74 and cable lead 76 for a digital readout (not shown) located so as to measure the location of carriage 12 with respect to base 4.

Figure 16:
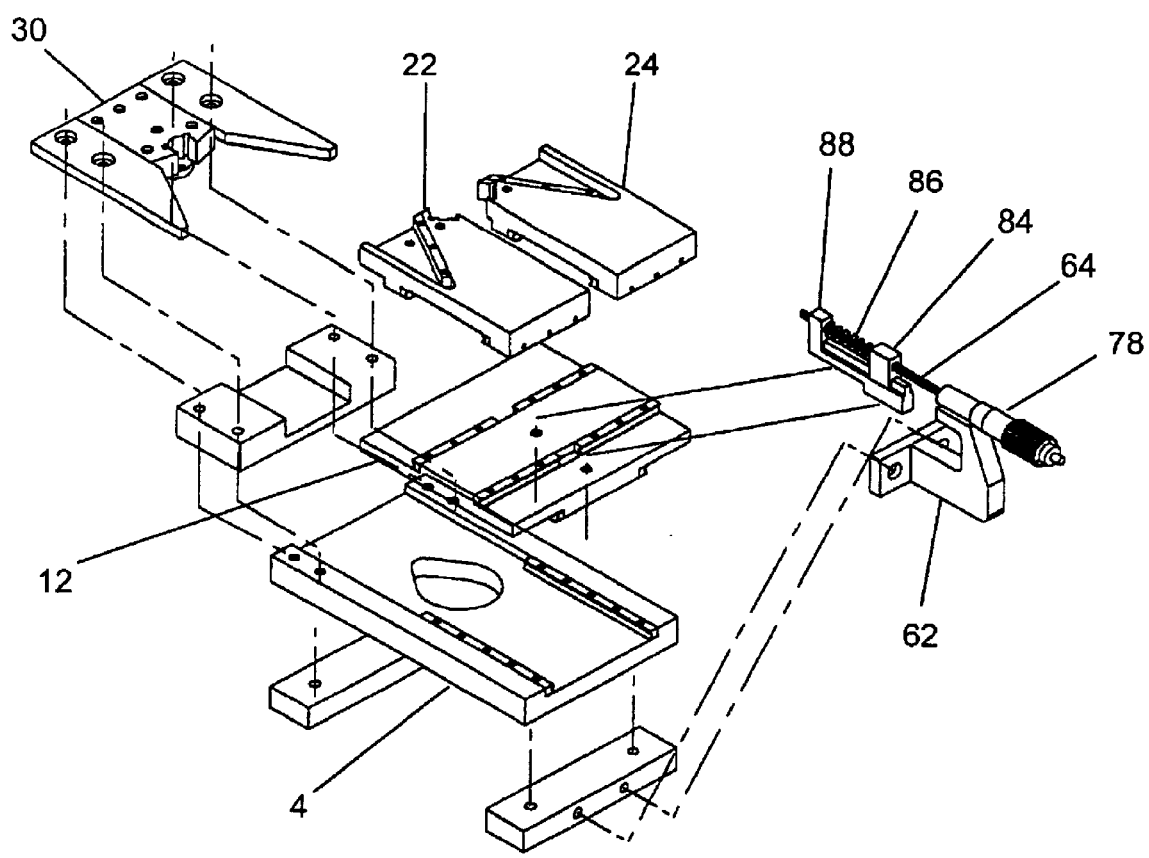
FIG. 16 is an exploded view of an alternative embodiment.
Figure 17:
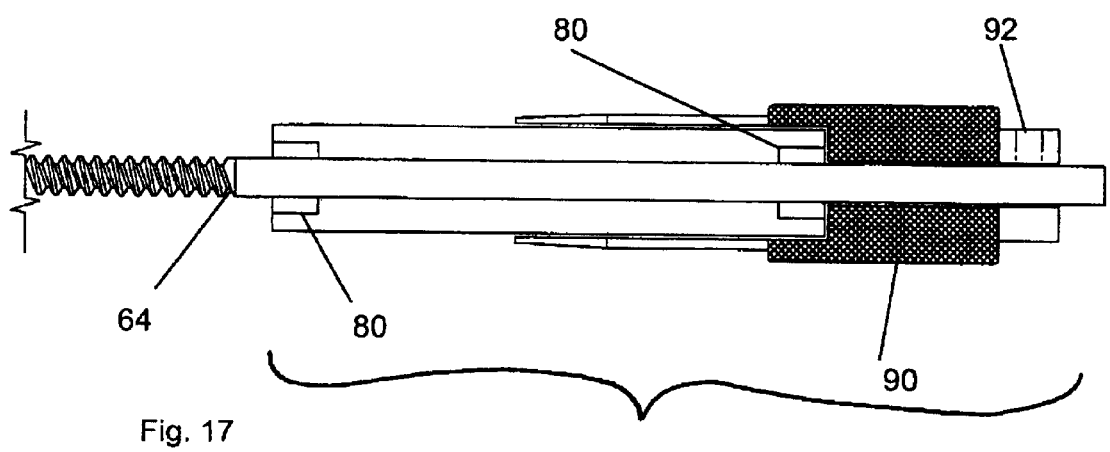
FIG. 17 is sectional view of a barrel assembly.

The accuracy and repeatability of a measurement is improved if the fixed gauge roll 44, first gauge roll 48 and second gauge roll 52 exert a known amount of force to the circular object being measured. A known amount of force may be exerted by a skilled machinist who has developed a 'touch,' such as with a micrometer 68. The embodiment of the present invention illustrated by FIGS. 15–17 can be used by a person who is not a skilled machinist and has not learned a 'touch' because the mechanism of the Invention supplies the requisite pre-selected amount of force to be applied to the circular object.

The pre-selected force is applied in the following manner, as shown by FIG. 15. A support bracket 62 is rigidly attached to the base 4. A barrel assembly 78 is supported by the support bracket 62. A screw 64 turns on bushings 80 in the barrel assembly 78 and the screw 64 is restrained from moving in the longitudinal direction 16 by the barrel assembly 78. The threads 82 of the screw 64 engage mating threads of a slide nut 84. The slide nut 84 slides on and is prevented from turning by the carriage 12, so that radial motion by the screw 64 results in longitudinal motion 16 by the slide nut 84. A spring 86 having a pre-selected rate engages the slide nut 84. The spring also engages a support bushing 88, which support bushing 88 is mounted on the carriage 12. The screw 64 passes through the support bushing 88, but the support bushing 88 is not threaded, so the screw 64 does not push directly on the support bushing 88.

As the screw 64 is moved in the radial direction, the screw 64 moves the slide nut 84 with respect to the screw 64, and hence with respect to the base 4. The slide nut 84 either pushes or pulls on the spring 86, depending on the direction of radial motion of the screw 64. The pushing or pulling force of the slide nut 84 is transmitted through the spring 86 to the support bracket 88, applying pushing or pulling force to the carriage 12.

In use, an operator rotates a thumb screw 90 which is affixed to the screw 64 by a set fastener 92. Rotation of the thumb screw 90 causes rotation of the screw 64 and motion of the slide nut 84, spring 86 and carriage 12. The thumb screw 90 is rotated until the gauge rolls 44, 48, 52 just engage the circular object. The thumb screw 90 is then advanced an additional, predetermined amount (for example, a tenth of a rotation). The additional rotation of the screw 64 advances the slide nut 84 by a predetermined amount, which compresses the spring 86 by a predetermined amount. The spring rate of the spring 86 is selected so that the pre-determined compression of the spring 86 produces the desired force on the circular object by the gauge rolls 44, 48, 52.

To assist the operator, graduations 94 may be included on the barrel assembly 78 to determine angular movement of the screw 64 and hence force applied to the circular object. Based on the known spring 86 rate and pitch of screw 64, the graduations 94 can be in units of force, such as ounces.

Figure 18:
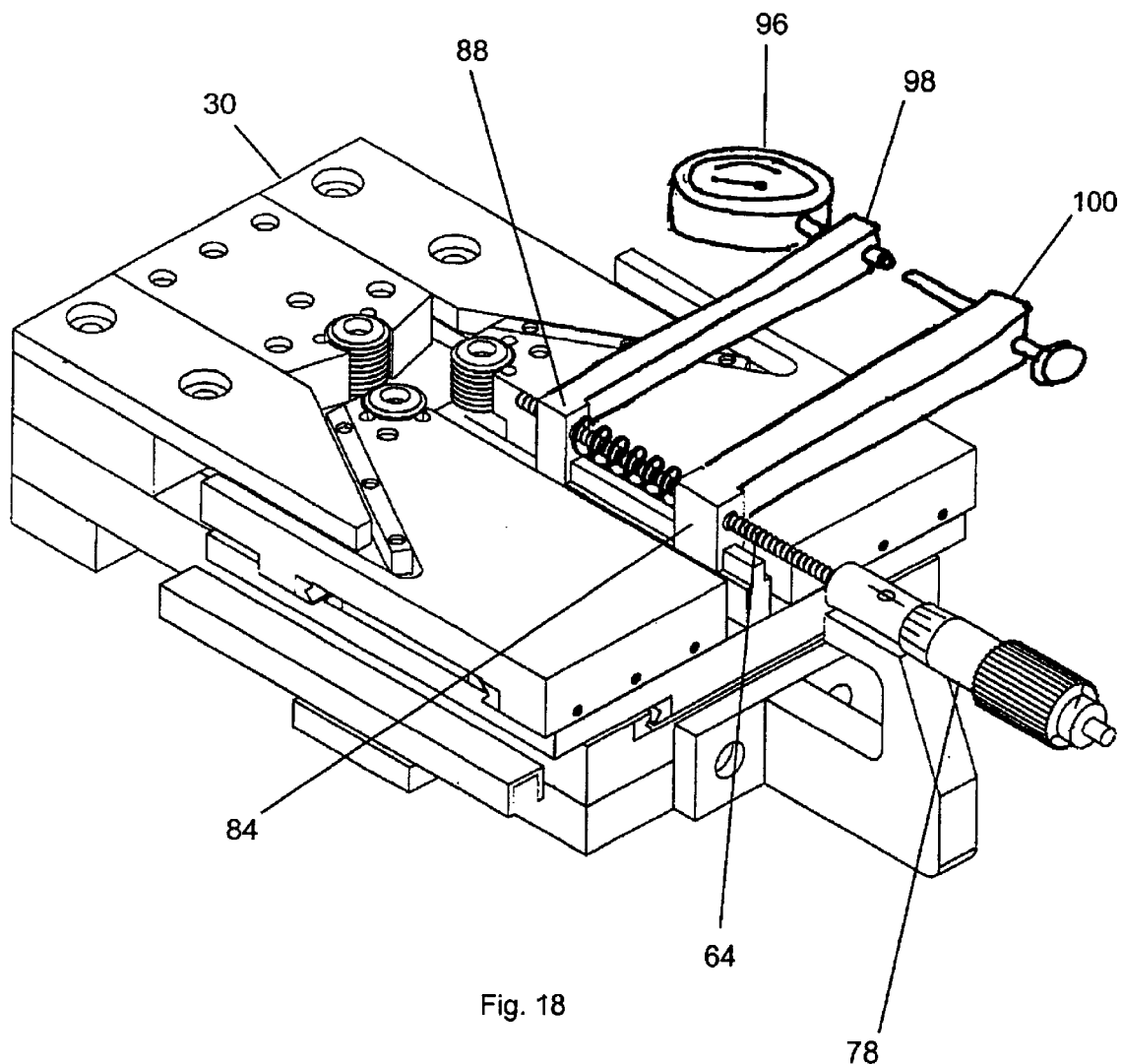
FIG. 18 is a perspective view of an alternative embodiment.

Alternatively, a dial indicator 96 (FIG. 18) can be attached to appropriate brackets 98 on the support bushing 88 or slide nut 84. A corresponding arm 100 on the slide nut 84 will engage the dial indicator 96, advising the operator of how much the spring 86 is compressed (or stretched). From the rate of spring 86, the operator then can determine the amount of force applied to the circular object by the gauge rolls 44, 48, 52.

In describing the above embodiments of the invention, specific terminology was selected for the sake of clarity. However, the invention is not intended to be limited to the specific terms so selected, and it is to be understood that each specific term includes all technical equivalents that operate in a similar manner to accomplish a similar purpose.

I claim:

1. A gauge for measuring a circular object comprising:
   a. a fixed gauge roll;
   b. a first gauge roll;
   c. a second gauge roll, said fixed gauge roll, said first gauge roll and said second gauge roll defining a triangle, said triangle defining interior angles;
   d. said fixed gauge roll being fixed;
   e. said first gauge roll and said second gauge roll being movable with respect to said fixed gauge roll such that said interior angles defined by said triangle are constant for every position of said first and said second gauge rolls with respect to said fixed gauge roll.

2. The gauge of claim 1, said fixed gauge roll having a point of contact with the circular object, said first gauge roll and said second gauge rolls each having a point of contact with the circular object, said points of contact of said first and second gauge rolls corresponding to said point of contact of said fixed gauge roll, said point of contact of said fixed gauge roll and said points of contact of said first and said second gauge rolls defining said triangle.

3. The gauge of claim 2, further comprising:
   a. a base, said fixed gauge roll being rigidly attached to said base;
   b. a carriage slidably engaging said base;
   c. a first table slidably engaging said carriage, said first gauge roll being attached to said first table;
   d. a second table slidably engaging said carriage, said second gauge roll being attached to said second table.

4. The gauge of claim 3, further comprising a lateral motion controller affixed to said base, said lateral motion controller in combination with said carriage, said first table and said second table maintaining said interior angles defined by said triangle constant for every position of said first and said second gauge rolls with respect to said fixed gauge roll.

5. The gauge of claim 4, said carriage being adapted to move in a longitudinal direction with respect to said base; said first table and said second table being adapted to move in a lateral direction with respect to said carriage.

6. The gauge of claim 5, said lateral motion controller slidably engaging said first table and said second table.

7. The gauge of claim 6, said lateral motion controller having a first sine bar and a second sine bar, said slidable engagement between said lateral motion controller and said first table comprising said first sine bar slidably engaging said first table, said slidable engagement between said lateral motion controller and said second table comprising said second sine bar slidably engaging said second table.

8. The gauge of claim 7, further comprising means for moving said carriage with respect to said base.

9. The gauge of claim 8, said means for moving said carriage with respect to said base comprising a screw, said screw having a screw thread, further comprising means for selecting a force applied by said fixed gauge roll, said first gauge roll and said second gauge roll to the object to be measured.

10. The gauge of claim 9, said means for selecting a force comprising:
    a. a slide nut, said slide nut having a slide nut thread, said slide nut thread engaging said screw thread such that a radial motion of said screw causes a longitudinal motion of said slide nut;
    b. a spring resiliently joining said slide nut and said carriage such that said spring urges said carriage to move upon said longitudinal motion of said slide nut in response to said radial motion of said screw.

11. The gauge of claim 10, further comprising said spring having a rate, said spring rate selected such that when said fixed gauge roll, said first gauge roll and said second gauge roll are in contact with said circular object, a pre-selected radial motion of said screw will cause a pre-selected change in force applied to said object to be measured by said fixed gauge roll, said first gauge roll and said second gauge roll.

12. The gauge of claim 7, further comprising means for measuring the location of said first and said second gauge rolls with respect to said fixed gauge roll.

13. The gauge of claim 12, said means for measuring the location of said first and said second gauge rolls with respect to said fixed gauge roll comprising measuring a position of said carriage with respect to said base.

14. The gauge of claim 13, said means being selected from the list comprising a vernier scale and a digital scale.

15. The gauge of claim 14, the circular object being an external thread or an internal thread.

16. A gauge for measuring a circular object comprising:
    a. a base;
    b. a fixed gauge roll attached to said base;
    c. a carriage slidably engaging said base, said carriage adapted to slide in a longitudinal direction with respect to said fixed gauge roll;
    d. a first table slidably engaging said carriage;
    e. a second table slidably engaging said carriage, said first and said second tables being adapted to slide in a lateral direction with respect to said carriage;
    f. a first gauge roll attached to said first table; and
    g. a second gauge roll attached to said second table;
    h. a lateral motion controller affixed to said base, said lateral motion controller slidably engaging said first table and said second table.

17. A method for measuring a circular object comprising the steps of:
    a. placing the circular object in a relation to a triangle defined by a fixed gauge roll, a first gauge roll and a second gauge roll;
    b. simultaneously advancing said first gauge roll and said second toward said fixed gauge roll until said fixed gauge roll, said first gauge roll and said second gauge roll engage the circular object;
    c. measuring the location of said first and said second gauge roll with respect to said fixed gauge roll.

18. The method of claim 17, said triangle having interior angles, said interior angles being constant for every location of said first gauge roll and said second gauge roll with respect to said fixed gauge roll.

19. The method of claim 18 comprising the additional step of applying a predetermined force to the object to be measured by said fixed gauge roll, said first gauge roll and said second gauge roll prior to the step of measuring the location of said first and second gauge rolls with respect to said fixed gauge roll.

20. The method of claim 19, said circular object comprising an external thread or an internal thread, said placing of the circular object in said relation to said triangle comprising placing said external thread within said triangle and placing said internal thread to surround said triangle.

* * * * *